May 27, 1930.  W. H. McKISSICK  1,760,273
AXLE MOUNTING FOR SAFETY SHEAVE BLOCKS
Filed Dec. 22, 1928  2 Sheets-Sheet 1
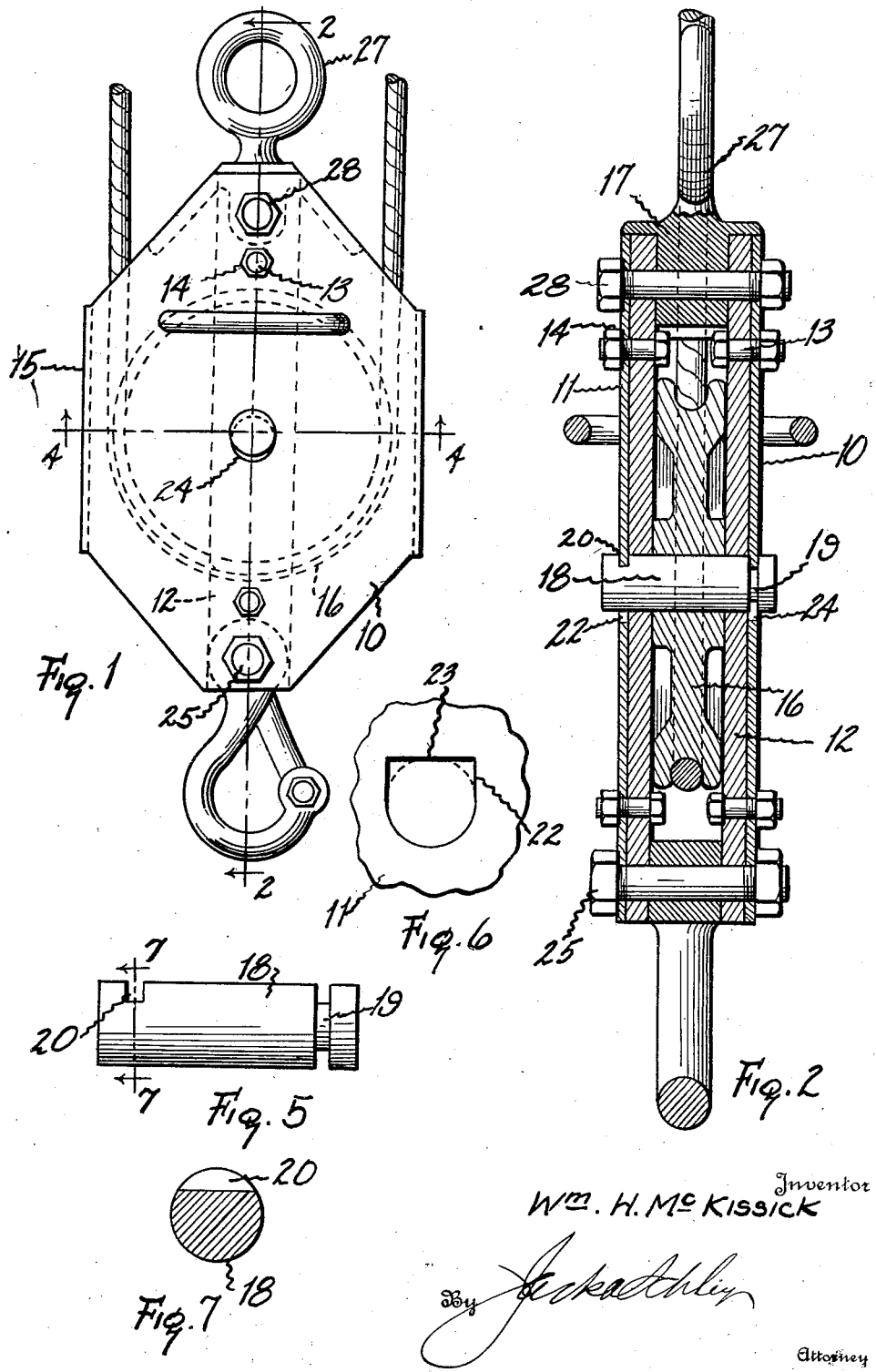
Inventor
Wm. H. McKissick May 27, 1930.  W. H. McKISSICK  1,760,273
AXLE MOUNTING FOR SAFETY SHEAVE BLOCKS
Filed Dec. 22, 1928  2 Sheets-Sheet 2

INVENTOR
Wm H. McKissick
BY
ATTORNEY

Patented May 27, 1930

1,760,273

UNITED STATES PATENT OFFICE

WILLIAM H. McKISSICK, OF TULSA, OKLAHOMA

AXLE MOUNTING FOR SAFETY SHEAVE BLOCKS

Application filed December 22, 1928. Serial No. 327,911.

This invention relates to new and useful improvements in axle mountings for sheave blocks.

One object of the invention is to provide simple means for fastening a sheave axle against longitudinal displacement and to do so without the use of keys or nuts and the like applied to the axle.

A further object of the invention is to provide a simple and improved axle mounted whereby the block may be split longitudinally and one section of the block rotated relatively of the other, to open the block for the insertion or removal of the cable lines.

A construction designed to carry out the invention will be hereinafter described, together with other features of the invention.

Figure 3:
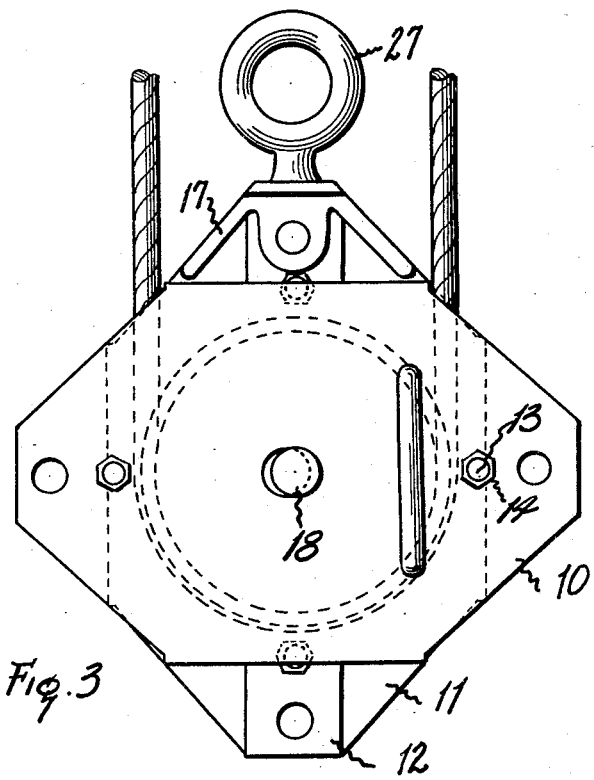
Figure 4:
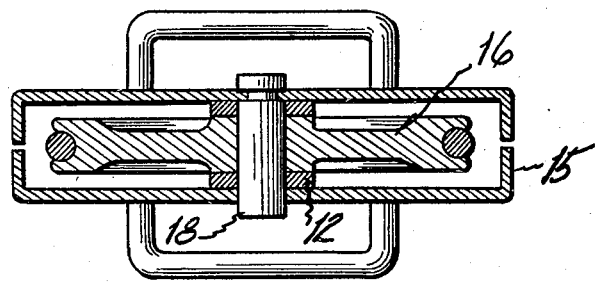

The invention will be more readily understood from a reading of the following specification and by reference to the accompanying drawings, in which an example of the invention is shown, and wherein:

Fig. 1 is a side elevation of a block constructed in accordance with the invention, Fig. 2 is an enlarged longitudinal sectional view of the same, Fig. 3 is a view showing the block open, Fig. 4 is a cross-sectional view taken on the line 4—4 of Fig. 1, Fig. 5 is a view of the axle, Fig. 6 is a detail of one of the axle seats, and Fig. 7 is a transverse sectional view taken on the line 7—7 of Fig. 5.

In the drawings the numeral 10 designates one side plate and 11 the other side plate of the housing of a sheave block. Each side plate is secured to the outer side of one of a pair of supporting straps or bars 12 by bolts 13 passing through the bars and plates and fastened by nuts 14.

Each plate has longitudinal guard flanges 15, as is shown in Figs. 1 and 4. These flanges are preferably disposed at substantially right angles to the side plates. When the housing is closed the flanges are directed toward each other and extend transversely of the sheave 16 journaled in said housing.

A top eye 27 has a depending shank forming a guard block 17 which extends on each side of the side bars. A bolt 28 passing through parts 10, 11, 12 and 17 fastens the block in place. This block, with the flanges 15, provides adequate guards which act to prevent the workman's fingers being drawn into the housing.

The essential feature of the invention resides in the axle mounting for the sheave 16. I provide a cylindrical axle 18 having a circumferential groove 19 near one end and a transverse notch 20 near its opposite end. The sheave 16 is positioned between the bars 12 and the axle slid through said sheave and openings in said bars, before the plates 10 and 11 are secured to said bars.

The plate 11 has a D shaped opening 22 with a transverse seat across its top. The opening is of such diameter as to permit the passage of the axle therethrough. The seat is registered with the notch 20 when the plate is applied and by sliding said plate the seat engages in the notch and locks the axle in place. The bolts are then inserted and fastened by the nuts 14. This fastens one side of the housing.

The plate 10 has a circular opening 24 through which the axle may pass. By sliding the plate on the adjacent bar, one side of the opening 24 is seated in the groove 19, thus locking the opposite end of the axle. After the plate 10 has been positioned it is fastened by the bolts 13 and nuts 14.

While the plates and bars are secured to the axle, the plate 10 with its bar 12 and flanges 15, after removing bolts 25 and 28, may be rotated on the axle as is shown in Fig. 3 to open the housing. The axle mounting is simple and efficient and eliminates nuts, keys, pins and other fastenings. The transverse seat 23 and notch 20 hold the axle against rotation.

Various changes in the size and shape of the different parts, as well as modifications and alterations, may be made within the scope of the appended claims.

What I claim, is:

1. In a safety sheave block, a housing comprising two members movable laterally of the sheave axis and each having inturned guard flanges on opposite sides of its longitudinal axis, the guard flanges of one member being normally aligned and registered with the guard flanges of the other member, an axle extending through the housing and having recesses receiving portions of the housing members, whereby said axle is held against longitudinal displacement, and a sheave journaled on the axle, one of said housing members being rotatable upon the axle and the other housing member engaging one of the recessed axle portions, whereby it is held against rotation.

2. In a safety sheave block, a pair of side plates having bolt openings of different configuration and longitudinal inturned flanges, supporting bars on which the side plates are mounted, an axle extending through the supporting bars and the side plates and having a circular recess and a recess with an angular wall for receiving portions of the side plates, means for fastening the side plates to the bars, whereby the axle is held against rotation and longitudinal displacement by the engagement of one plate with said wall, and a sheave journaled on the axle.

3. In a safety sheave block, a pair of side plates having longitudinal inturned flanges, supporting bars on which the side plates are mounted, an axle extending through the bars and the side plates and having notches for receiving said side plates, the axle being held against rotation by one of the side plates engaging one notch while the other side plate is rotatable within the other notch on said axle, said axle being held against longitudinal displacement by both side plates, and a sheave journaled on the axle.

4. In a safety sheave block, a pair of side plates, one having a circular opening and the other having an opening provided with a straight edge, supporting bars having openings for registering with the openings of the plates, an axle extending through the openings of the bars and plates and having a circumferential groove at one end for receiving the edge of the plate having a circular opening and provided with a notch for receiving the straight edge of the opening of the other plate, whereby said axle is fastened against longitudinal displacement and is held against rotation by one plate and whereby the other plate may be rotated, a sheave mounted on said axle, and means for fastening the plates in position.

In testimony whereof I affix my signature.

WILLIAM H. McKISSICK.